United States Patent
Matsuoka et al.

(10) Patent No.: US 11,969,813 B2
(45) Date of Patent: Apr. 30, 2024

(54) SPOT WELDING METHOD

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hideaki Matsuoka, Nagakute (JP); Takanori Nakagaki, Nagakute (JP); Kyosuke Izuno, Nisshin (JP); Koki Nakada, Toyota (JP); Manabu Ooga, Kariya (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

(*) Notice: Subject to any disclaimer, the term of this patent is extended or adjusted under 35 U.S.C. 154(b) by 357 days.

(21) Appl. No.: 17/185,510

(22) Filed: Feb. 25, 2021

(65) Prior Publication Data
US 2021/0268597 A1 Sep. 2, 2021

(30) Foreign Application Priority Data
Mar. 2, 2020 (JP) .................. 2020-035114

(51) Int. Cl.
*B23K 11/18* (2006.01)
*B23K 11/11* (2006.01)
*B23K 103/10* (2006.01)

(52) U.S. Cl.
CPC .......... *B23K 11/185* (2013.01); *B23K 11/115* (2013.01); *B23K 2103/10* (2018.08)

(58) Field of Classification Search
CPC ....... B23K 11/10; B23K 11/11; B23K 11/115; B23K 11/185; B23K 2103/10
(Continued)

(56) References Cited

U.S. PATENT DOCUMENTS

2005/0028897 A1* 2/2005 Kurz ................. B23K 26/0604
148/525
2013/0048613 A1* 2/2013 Sigler .................. B23K 11/115
219/91.2
(Continued)

FOREIGN PATENT DOCUMENTS

JP   H07-108383 A   4/1995
JP   2001-105151 A   4/2001
(Continued)

OTHER PUBLICATIONS

Dec. 13, 2022 Office Action issued in Japanese Patent Application No. 2020-035114.

*Primary Examiner* — Janie M Loeppke
*Assistant Examiner* — Simpson A Chen
(74) *Attorney, Agent, or Firm* — Oliff PLC (57) ABSTRACT

A spot welding method includes a heating step of energizing an electrode in pressure contact with an Al alloy member to heat and melt a join part by resistance heating and a cooling step of cooling the join part after the heating step in a state in which the electrode is in pressure contact with the Al alloy member. The alloy is a wrought alloy of Mg: 0.2 to 1.2 mass %, Si: 0.4 to 1.5%, and Cu: 1.1% or less or a casting alloy of Si: 7 to 11% and Mg: 0.1 to 0.4% with respect to 100% as a whole. The cooling step includes a first cooling process performed with a reduced amount of input energy to the join part as compared with the heating step and a second cooling process performed after the first cooling process at a higher cooling rate than that in the first cooling process.

8 Claims, 6 Drawing Sheets

(58) Field of Classification Search
USPC .......................................................... 219/119
See application file for complete search history.

(56) References Cited

U.S. PATENT DOCUMENTS

| | | | |
|---|---|---|---|
| 2016/0221109 A1* | 8/2016 | Pieterman | B23K 11/185 |
| 2016/0368080 A1* | 12/2016 | Hatta | B23K 11/314 |
| 2017/0232547 A1* | 8/2017 | Chai | B23K 11/11 |
| | | | 219/86.22 |
| 2019/0039183 A1* | 2/2019 | Morton | B23K 26/034 |
| 2019/0247948 A1* | 8/2019 | Hioki | B23K 11/241 |

FOREIGN PATENT DOCUMENTS

| | | | |
|---|---|---|---|
| JP | 2004-98107 A | | 4/2004 |
| JP | 2004098107 A | * | 4/2004 |
| JP | 2010-279991 A | | 12/2010 |
| JP | 2019-508253 A | | 3/2019 |

* cited by examiner

《Overview》

《Conditions》

《Test》

SPOT WELDING METHOD

TECHNICAL FIELD

The present invention relates to a spot welding method for a member made of an aluminum alloy (also referred to as an "Al alloy") and relevant techniques.

BACKGROUND ART

Vehicle bodies and other similar bodies are manufactured by spot welding of a plurality of sheet materials (materials to be joined). Spot welding is one type of resistance welding, which is performed by energizing the materials to be joined with a large current for a short time from electrodes that are in pressure contact with the surfaces of the materials to be joined. Through this energization, a molten part is formed inside the materials to be joined which are in a stacked form, an abutting form, or the like, and the molten part is cooled with the electrodes in contact with the join part and solidified into a welded part. The spot-shaped welded part (so-called nugget) formed as above joins the materials to be joined, thus resulting in a weldment.

In recent years, not only steel materials with low electrical conductivity and low thermal conductivity, but also Al alloy materials with high electrical conductivity and high thermal conductivity have been spot-welded. Descriptions relevant to this are found, for example, in the following patent document.

PRIOR ART DOCUMENTS

Patent Documents

[Patent Document 1] JP2004-98107A

SUMMARY OF INVENTION

Technical Problem

Patent Document 1 proposes timing charts of the welding pressure and current value related to spot welding of Al alloy materials (material to be joined). Specifically, the welding pressure is increased immediately before the end of primary energization for welding, and after the primary energization, postheat energization with current is performed, in which the current value is reduced (FIG. 1). Patent Document 1 also proposes that the postheat energization with current be performed with a downslope in which the current value is monotonically reduced with time ([0014] and FIG. 3(d)). Patent Document 1 further proposes timing charts in which the downslope-like postheat energization with current is stopped in mid-course (the current is rapidly reduced to zero) ([0020] and FIGS. 2 and 3(e)).

If, as in Patent Document 1, the postheat energization with current in which the current value is set constant or the postheat energization with current in which the current value of the primary energization is gradually reduced to zero is performed, then the cooling of the join part will be moderate. This can suppress solidification cracking of the join part. However, the time during which the materials to be joined (Al alloy) and the electrodes (copper alloy) are in contact with each other at a high temperature (referred to as "high temperature contact time") will be elongated accordingly. As a result, welding adhesion (cohesive adhesion) is likely to occur between the materials to be joined and the electrodes due to the eutectic reaction between the Al alloy and the copper alloy.

On the other hand, if the postheat energization with current is stopped in the middle of the downslope, the high temperature contact time between the materials to be joined and the electrodes will be reduced. In this case, it seemingly appears that the welding adhesion between the materials to be joined and the electrodes is avoided in addition to suppression of the solidification cracking of the join part.

However, when the present inventors performed the spot welding with the timing chart (primary energization for welding and postheat energization with current) as illustrated in FIG. 3(e) of Patent Document 1 using an Al—Mg-based alloy (A5083) similar to the aluminum alloy (JIS A5182-0) described in of Patent Document 1, it was found that weld cracking (in particular, solidification cracking) occurred.

The present invention has been made in view of such circumstances and an object of the present invention is to provide a spot welding method for Al alloy members and relevant techniques different from the prior art.

Solution to Problem

As a result of intensive studies to achieve the above object, the present inventors have found that the weld cracking and the welding adhesion can be avoided by performing a predetermined cooling process after the primary energization in the case of a material to be joined that is made of an Al alloy having a specific component composition. Developing this achievement, the present inventors have accomplished the present invention, which will be described hereinafter.

«Spot Welding Method»

(1) The present invention provide a spot welding method comprising: a heating step of energizing an electrode in pressure contact with an aluminum alloy member to heat and melt a join part of the aluminum alloy member by resistance heating; and a cooling step of cooling the join part after the heating step in a state in which the electrode is in pressure contact with the aluminum alloy member. The aluminum alloy member is made of an aluminum alloy of Mg: 0.2 to 1.2 mass % (simply referred to as "%"), Si: 0.4 to 1.5%, and Cu: 1.1% or less or an aluminum alloy of Si: 7 to 11% and Mg: 0.1 to 0.4% with respect to 100% as a whole. The cooling step includes a first cooling process performed with a reduced amount of input energy to the join part as compared with the heating step and a second cooling process performed after the first cooling process at a higher cooling rate than that in the first cooling process.

(2) In the spot welding method (also simply referred to as a "welding method") of the present invention, the cooling step including at least the first cooling process and the second cooling process is performed. The first cooling process is performed with a reduced amount of input energy as compared with the heating step (so-called primary energization). During the first cooling process, the molten part formed in the heating step is slowly cooled to suppress the solidification cracking caused by the solidification shrinkage.

The second cooling process is performed for rapid cooling at a higher cooling rate than that in the first cooling process. This can shorten the high temperature contact time between the join part and the electrode to suppress the welding adhesion between them. Moreover, the welded part formed by the solidification of the molten part is rapidly cooled to suppress the coarsening of the metallographic structure. As a matter of course, the time required for the cooling step is shortened by the rapid cooling in the second cooling process to reduce the welding time at each spot and therefore improve the productivity of weldments.

«Others»
(1) In the present specification, the aluminum alloy member (Al alloy member) to be spot-welded is referred to as a material to be joined or a work as appropriate. The join part refers to a portion of the material to be joined that is involved in the spot welding. The join part is not limited to a portion to be the welded part. The molten part is a molten pool formed by the heating step (resistance heating). The solidified part in which the molten part is cooled and solidified is to be the welded part (nugget). In general, a corona bond (solid phase joining) is formed on the outer peripheral side of the welded part, and a heat-affected zone that is not involved in the joining is further formed on the outer peripheral side of the corona bond.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. Unless otherwise stated, a range "x to y MPa" as referred to in the present specification means x MPa to y MPa. The same applies to other unit systems.

EMBODIMENTS FOR CARRYING OUT THE INVENTION

One or more features freely selected from the present specification can be added to the above-described features of the present invention. The content described in the present specification can be applied not only to welding methods but also to weldments etc. Which embodiment is the best or not is different in accordance with objectives, required performance, and other factors.

«Material to be Joined»
(1) Al Alloy

The material to be joined is preferably made of an Al alloy that can avoid the solidification cracking and the welding adhesion in the cooling step (including the first cooling process and the second cooling process) after the heating step. As will be described later in detail, the material to be joined is preferably made, for example, of an Al alloy in which the boundary line of the BTR diagram described later sharply rises (e.g., $d\varepsilon/dT \geq 0.1$ (%/° C.)) around the solidus temperature (e.g., 550 to 630° C.).

Such an Al alloy may be a wrought alloy or may also be a casting alloy regardless of the method of manufacturing the material to be joined itself. The wrought alloy is preferably, for example, an Al—Mg—Si-based alloy (such as a 6000 series alloy). The casting alloy is preferably, for example, an Al—Si—Mg-based alloy.

In the case of an Al—Mg—Si-based alloy, for example, the specific component composition is preferably of Mg: 0.2 to 1.2% (simply referred to as "%") in an embodiment, 0.3 to 1.1% in another embodiment, or 0.4 to 1% in still another embodiment, Si: 0.4 to 1.5% in an embodiment, 0.5 to 1.3% in another embodiment, or 0.6 to 1.1% in still another embodiment, Cu: 1.1% or less in an embodiment, 0.9% or less in another embodiment, or 0.6% or less in still another embodiment, and the balance: Al and modifying elements and/or impurities with respect to 100% as a whole. Such an Al alloy is excellent in the formability, bake hardening properties (BH properties), and other similar properties.

In the case of an Al—Si—Mg-based alloy, for example, the specific component composition is preferably of Si: 7 to 11% in an embodiment or 8 to 10% in another embodiment, Mg: 0.1 to 0.4% in an embodiment or 0.15 to 0.3% in another embodiment, and the balance: Al and modifying elements and/or impurities with respect to 100% as a whole. Such an Al alloy is excellent in the casting properties, mechanical strength, machinability, and other similar properties. Regarding the BTR diagram related to the solidification cracking, the alloy composition determines the ratio of liquid phase generation depending on the solidus temperature and the coefficient of partition.

The Al alloy may contain a small amount of elements such as Mn, Zn, Fe, Cr, Ni, Ti, Sn, and Pb in accordance with the chemical components of a 6000 series alloy and an Al—Si—Mg-based alloy, which are typical examples. These elements can be perceived as impurities, but can also be perceived, for example, as modifying elements that contribute to the miniaturization of crystal grains, the improvement of strength, etc.

The content of Mn may be, for example, 1.0% or less in an embodiment, 0.8% or less in another embodiment, 0.7% or less in still another embodiment, or 0.15% or less in a further embodiment. The content of Zn may be, for example, 1% or less in an embodiment, 0.7% or less in another embodiment, 0.3% or less in still another embodiment, or 0.1% or less in a further embodiment. The content of Fe may be, for example, 1.3% or less in an embodiment, 0.8% or less in another embodiment, 0.7% or less in still another embodiment, 0.5% or less in yet another embodiment, or 0.35% or less in a further embodiment. The content of Cr may be, for example, 0.35% or less in an embodiment, 0.25% or less in another embodiment, or 0.1% or less in still another embodiment. The content of Ni may be 0.7% or less in an embodiment, 0.5% or less in another embodiment, or 0.3% or less in still another embodiment. The content of Ti, Sn, and Pb may be, for example, 0.3% or less in an embodiment, 0.2% or less in another embodiment, 0.15% or less in still another embodiment, or 0.1% or less in a further embodiment. The lower limit of each of these elements is not limited. Suffice it to say that the content of each element may be, for example, 0.01% or more in an embodiment, 0.05% or more in another embodiment, or 0.1% or more in still another embodiment.

As a specific example, the chemical components of an A6022 alloy are of Si: 0.8 to 1.5%, Fe: 0.05 to 0.2%, Cu: 0.01 to 0.11%, Mn: 0.02 to 0.1%, Mg: 0.45 to 0.7%, Cr≤0.1%, Zn≤0.25%, Ti≤0.15%, and the balance: Al.

The chemical components of an A6061 alloy are of Si: 0.4 to 0.8%, Fe≤0.7%, Cu: 0.15 to 0.4%, Mn≤0.15%, Mg: 0.8 to 1.2%, Cr: 0.04 to 0.35%, Zn≤0.25%, Ti≤0.15%, and the balance: Al.

The chemical components of an Al—Si—Mg-based alloy are, for example, of Si: 7 to 11%, Mg: 0.1 to 0.4%, Fe≤0.3%, Mn≤0.5% or less, Ti≤0.2%, and the balance: Al.

(2) Form

The form of the material to be joined is not limited. At least one of the materials to be joined by spot welding is, for example, a sheet material. In this case, for example, a stack of multiple (two or more) sheet materials (stacked sheets) may be spot-welded, or a sheet material and a non-sheet member (such as a block) may also be spot-welded. When stacked sheets are spot-welded, the thicknesses of the sheets may be the same or different. The type of the materials to be joined by spot welding may be the same or different.

«Heating Step»

In the heating step, the electrode in pressure contact with the material to be joined is energized to heat the join part by resistance heating and melt the part to be welded (molten part, portion to be the welded part) on the joint surface side. The current value in this step may be, for example, a current value of 25 to 50 kA in an embodiment or 30 to 45 kA in another embodiment. The current to be supplied may be alternating current or direct current (this is also the same in the cooling step). When primary energization is performed using a constant direct current, control of the amount of input energy (heating amount) is easy. The energization performed in the heating step (energization for forming the molten part) is referred to as "primary energization" as appropriate.

The energization time can be adjusted in accordance with the material, form, and the like of the material to be joined. The energization time in the primary energization may be, for example, 10 to 150 ms in an embodiment or 20 to 100 ms in another embodiment.

The heating step is performed in a state in which the electrode is in pressure contact with the surface side of the join part. The welding pressure to the join part applied by the electrode is preferably, for example, 50 to 150 MPa in an embodiment or 75 to 125 MPa in another embodiment. If the welding pressure is unduly small, the contact resistance between the electrode and the join part will increase to cause the occurrence of explosion (dust). If the welding pressure is unduly large, reduction in electrode life, excessive deformation of the material to be joined, or other troubles will be caused.

The welding pressure may be varied during the heating step, but may also be constant. The welding pressure is obtained by dividing the applied load to the electrode by the cross-sectional area (projected area/usually, the area corresponding to the "nominal diameter") of the tip portion of the electrode. The content related to the welding pressure applies also to the cooling step.

«Cooling Step»

In the cooling step, the molten part generated in the heating step is cooled and solidified to form a solidified part (welded part/nugget). The cooling step includes at least a first cooling process and a second cooling process. The cooling step may be divided into three or more processes of cooling. In any case, the join part (molten part) is cooled by heat removal through the electrode in pressure contact with the material to be joined.

(1) The first cooling process follows the heating step and is performed by energization in which the amount of input energy (current value and/or voltage value) is reduced as compared with the time of the primary energization (heating step). This energization avoids rapid cooling of the join part through the electrode, and controlled cooling (slow cooling) is performed with an adjusted cooling rate. The energization in this process is referred to as "secondary energization" and the current value in the secondary energization is referred to as a "secondary current value" as appropriate.

When the secondary energization is performed by current control, it is preferred to gradually reduce the secondary current value for energizing the electrode. The gradual reduction of the secondary current value may be linearly performed or may also be non-linearly performed. The reduction rate of the secondary current value with respect to time may be, for example, 150 to 450 A/ms in an embodiment or 200 to 350 A/ms in another embodiment.

The first cooling process is preferably continued until the solid phase ratio of the molten part formed in the heating step becomes at least 60% or more in an embodiment, 70% or more in another embodiment, or 80% or more in still another embodiment. Such slow cooling to a high solid phase ratio ensures supply of the liquid phase in the pressurized molten part (solid-liquid coexistence state) to suppress the solidification cracking. The solid phase ratio is determined by the temperature of the join part or molten part obtained from measurement or analysis.

The first cooling process may be continued until the temperature of the molten part comes into a temperature range in which the temperature of the molten part is higher than the solidus temperature (Ts) of the Al alloy by 10 to 50° C. in an embodiment or 20 to 40° C. in another embodiment. In other words, the cooling step preferably shifts from the first cooling process to the second cooling process when the temperature (T) of the molten part comes into a range of Ts+10° C. to Ts+50° C. in an embodiment or a range of Ts+20° C. to Ts+40° C. in another embodiment.

In the first cooling process, the average cooling rate of the welded part is preferably $1\times10^2$ to $5\times10^{4\circ}$ C./s in an embodiment or $1\times10^3$ to $1\times10^{4\circ}$ C./s in another embodiment. The average cooling rate is obtained by dividing the temperature change in the first cooling process by the required time. The temperature of each part is obtained by analyzing the temperature change during the welding as a function of the elapsed time in the cooling process using welding simulation software (such as SORPAS available from SWANTEC Software and Engineering ApS) for each model (material to be joined, weldment).

(2) The first cooling process is followed by the second cooling process which is performed at a higher cooling rate than that in the first cooling process. The cooling rate is not limited, provided that more rapid cooling is achieved in the second cooling process than in the first cooling process. The second cooling process may be a controlled cooling process with the energization to the electrode, but may also be performed by shutting off the energization to the electrode. The cooling rate in the second cooling process may be adjusted based on the BTR diagram of the Al alloy. However, fortunately, in the BTR diagram of the Al alloy according to the present invention, the boundary line rises sharply in the region of a high solid phase ratio (around the solidus temperature). The solidification cracking can therefore be avoided even when the energization to the electrode is shut off to increase the cooling rate in the second cooling process.

The second cooling process is preferably continued until the temperature of the welded part (solidified part) becomes a temperature equal to or lower than the recrystallization temperature of the Al alloy (or a temperature half the melting point). Rapid cooling to a temperature equal to or lower than the recrystallization temperature suppresses the occurrence of hot cracking in the join part (weld cracking that occurs around the recrystallization temperature after the solidification). Moreover, the rapid cooling avoids the coarsening of the metallographic structure of the join part (in particular, the welded part). In the second cooling process, the cooling rate may be constant or changed. In an embodiment, for example, the second cooling process may be changed from a cooling process with energization to a cooling process with energization shut off.

(3) The first cooling process and the second cooling process are preferably performed at a cooling rate that does not cross the boundary line of a diagram (BTR diagram) representing the brittleness temperature region (BTR) of the aluminum alloy. Additionally or alternatively, the first cooling process and the second cooling process are preferably performed so that the temperature of the molten part becomes a temperature along the boundary line. This will be specifically described below.

Figure 1A:
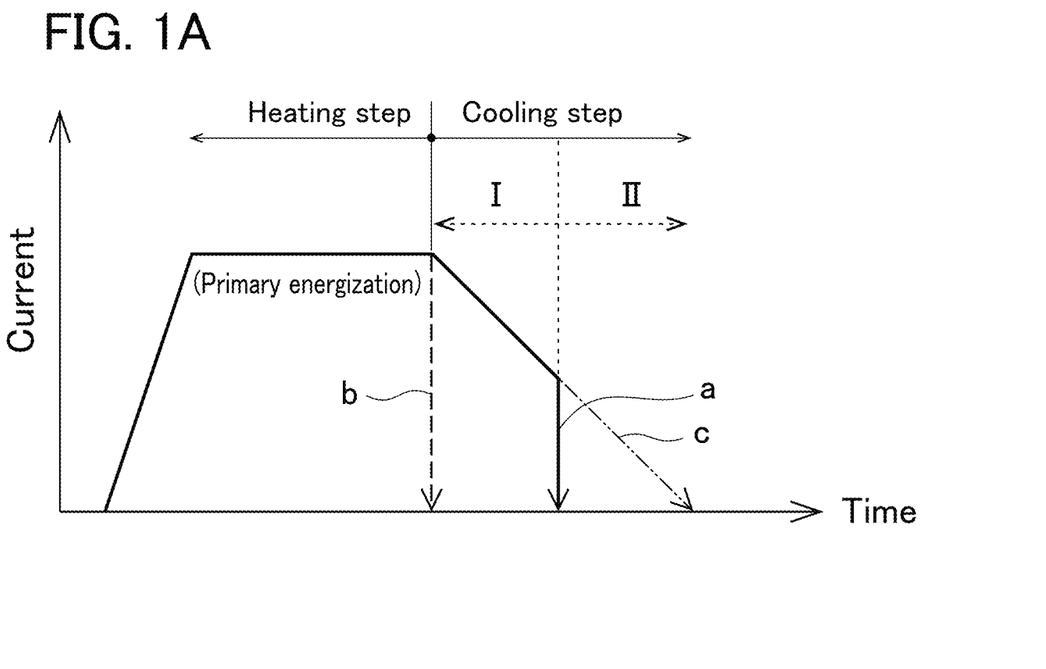
FIG. 1A is an example of a time chart in the heating step and the cooling step.

FIG. 1A illustrates an example of the time chart in each process. The time chart represents three cooling patterns "a" to "c" related to the cooling step. The cooling pattern "a" is in a case of performing multi-stage cooling (cooling process I and cooling process II) as in the present invention. Here, it is assumed that the cooling process I is a slow cooling process (controlled cooling) in which the electrode is energized while gradually reducing the current value and the cooling process II is a rapid cooling process in which the energization to the electrode is shut off. The cooling pattern "b" is in a case of performing the cooling process II (rapid cooling with energization shut off) from immediately after the heating step. The cooling pattern "c" is in a case of continuously performing the cooling process I (controlled cooling) from immediately after the heating step until the current value becomes zero while being gradually reduced.

Figure 1B:
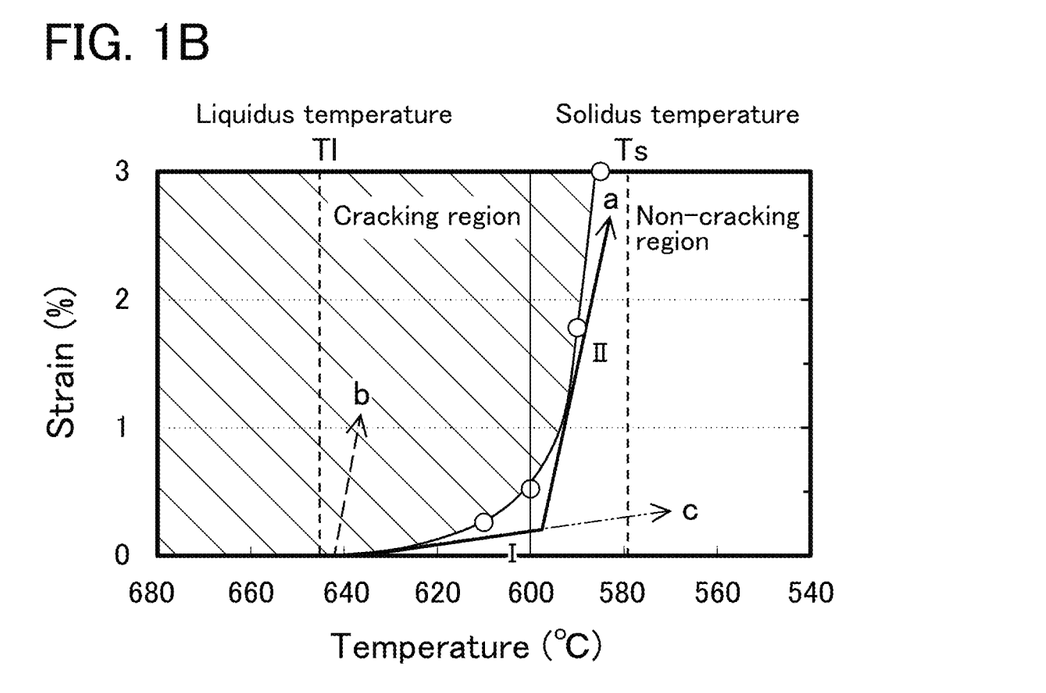
FIG. 1B is an example of a BTR diagram of an Al alloy.

FIG. 1B illustrates an example of the BTR diagram. The BTR diagram represents whether a given point between around the liquidus temperature and around the solidus temperature falls under a cracking region in which solidification cracking occurs or a non-cracking region in which solidification cracking does not occur, in terms of the temperature of the Al alloy and the strain acting in the Al alloy. The boundary line between the cracking region (on the left side of the boundary line) and the non-cracking region (on the right side of the boundary line) varies depending on the component composition of the Al alloy. If whether or not the strain change with respect to the temperature change exceeds the boundary line (whether or not the strain change falls under the cracking region) is known based on the BTR diagram, it is also possible to know whether or not the solidification cracking can occur.

The BTR diagram also illustrates the relationship between the temperature and the strain when each of the above-described cooling patterns "a" to "c" is performed. In the case of the cooling pattern "a," for example, the cooling process I and the cooling process II can be set so as to have tangent lines along the outside (right side) of the boundary line. In this case, the strain change with respect to the temperature change does not cross the boundary line, and the solidification cracking can therefore be avoided. Moreover, the occurrence of welding adhesion between the electrode and the join part is avoided because the high temperature contact time between them is shortened by the cooling process II with a high cooling rate.

On the other hand, in the case of the cooling pattern "b," the slow cooling (cooling process I) is not provided after the heating step; therefore, the strain change with respect to the temperature change is large and falls under the cracking region beyond the boundary line of the BTR diagram, and the solidification cracking is likely to occur. In contrast, in the case of the cooling pattern "c," the slow cooling is provided after the heating step; therefore, the strain change with respect to the temperature change is small and falls under the non-cracking region without crossing the boundary line, and the solidification cracking is less likely to occur. In the cooling pattern "c," however, the welding adhesion is likely to occur between the electrode and the join part because the high temperature contact time between them is long.

The BTR diagram is determined for each type (component composition) of the Al alloy and is obtained by evaluating the breaking strength or breaking strain by a tensile test, a bending test, or the like under an environment around the solidus temperature.

«Electrode»

(1) Form

The electrode for resistance spot welding (simply referred to as an "electrode") may be one that can be detachably attached to a shank (a cap tip-type electrode) or may also be one that is integrated with a shank (an integrated-type electrode). The cap tip-type electrode (also referred to as a "tip") is usually used, with which the welding cost can be reduced.

The electrode (tip) has, for example, a tip portion that is formed in a bottomed and substantially cylindrical shape and a body portion that is formed in a substantially cylindrical shape and merges into the tip portion. The outer surface (pressure contact surface) of the tip portion may be a concave surface that is recessed with respect to the material to be joined or may also be a convex surface that is not recessed. The size of the electrode is not limited, but for example, the outer diameter (B/original diameter/nominal diameter) of the body portion is preferably, for example, φ10 to 20 mm in an embodiment or φ14 to 18 mm in another embodiment.

The electrode is preferably configured such that a cooling medium (cooling liquid/cooling water) is introduced into an inner cylindrical part provided inside the tip portion. When the cooling medium is forcibly circulated, suppression of temperature rise of the electrode and cooling of the join part through the electrode are stably achieved.

Various basic shapes of the tip portions of electrodes (in particular, convex electrodes) are defined in JIS C9304 (1999). Examples of the basic shapes include a flat shape (F-type), a radius shape (R-type), a dome shape (D-type), a dome radius shape (DR-type), a cone frustum shape (CF-type), and a cone frustum radius shape (CR-type). Any shape can be used, but the DR-type or F-type electrode is excellent in the balance between the cooling ability and the strength.

(2) Material

The electrode (at least the tip portion) is preferably made of a material excellent in the thermal conductivity, electrical conductivity, strength, etc. For example, the electrode to be used is made of a copper alloy having an electrical conductivity of 75 to 95% IACS in an embodiment or 80 to 90% IACS in another embodiment. The copper alloy is, for example, chromium copper, zirconium copper, chromium-zirconium copper, alumina-dispersed copper, beryllium copper, or the like.

EXAMPLES

The present invention will be specifically described below with reference to BTR diagrams of various Al alloys and evaluation of various samples that are spot-welded by changing the cooling step.

<BTR Diagram>

Figure 2:
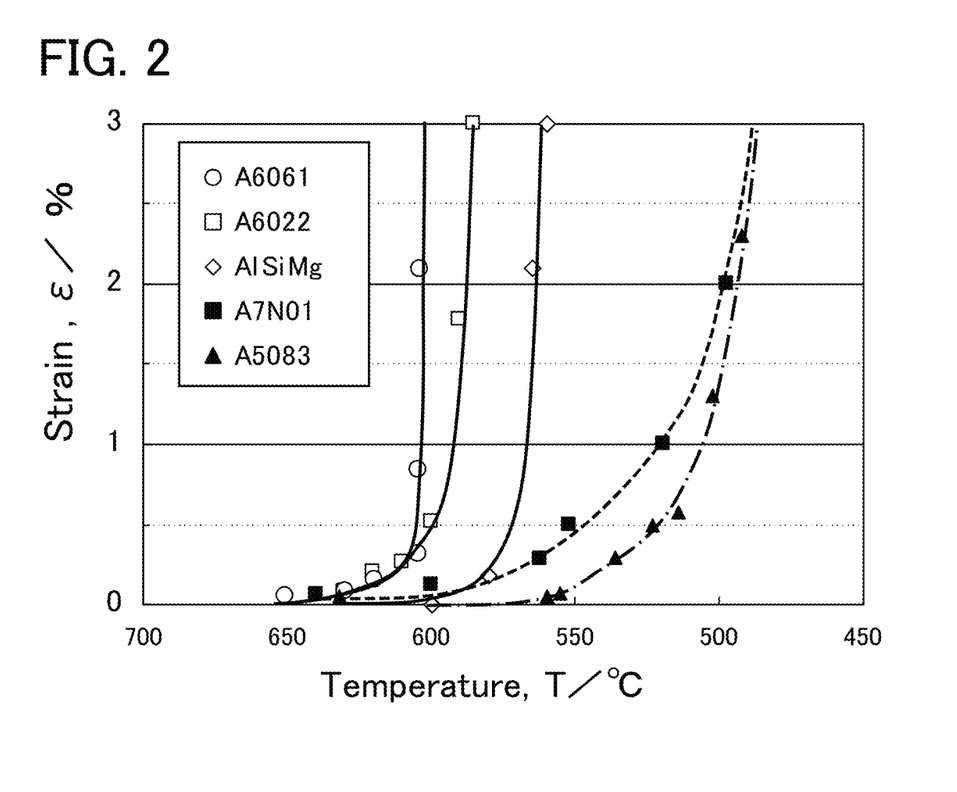
FIG. 2 is a BTR diagram of various Al alloys.

BTR diagrams of five types of Al alloys with different chemical components are collectively illustrated in FIG. 2. Each BTR diagram was obtained by the previously described method. The Al alloys are four types of wrought alloys (A6022, A6061, A5083, and A7N01) and one type of casting alloy (Al—Si—Mg alloy/simply denoted by "AlSiMg"). The Si, Mg, and Cu contained in each Al alloy are as follows. In each case, the content is represented by the mass ratio with respect to 100 mass % (simply referred to as "%") of the Al alloy as a whole.

A6022 . . . Si: 0.8 to 1.5%, Mg: 0.45 to 0.7%, and Cu: 0.01 to 0.11%

A6061 . . . Si: 0.4 to 0.8%, Mg: 0.8 to 1.2%, and Cu: 0.15 to 0.4%

A5083 . . . Si≤0.4%, Mg: 4 to 4.9%, and Cu≤0.1%

A7N01 . . . Si≤0.3%, Mg: 1 to 2%, and Cu≤0.2%

AlSiMg . . . Si: 7.5 to 9.5% and Mg: 0.1 to 0.4%

As can be seen from the BTR diagrams illustrated in FIG. 2, in the Al alloys (A6022, A6061, and AlSiMg) in which Si, Mg, and Cu are within respective predetermined ranges, the boundary line rises sharply from just before the solidus temperature. On the other hand, in the Al alloys (A5083 and A7N01) in which Si, Mg, and Cu are not within the respective predetermined ranges, the boundary line extends to a temperature lower than the solidus temperature, and the cracking region is very wide.

For reference, the liquidus temperature (Tl), the solidus temperature (Ts), and the recrystallization temperature (Tr) of each Al alloy are as follows. The eutectic temperature of Al and Cu is 548° C.

A6022 . . . Tl=655° C., Ts=588° C., and Tr=330° C.
A6061 . . . Tl=652° C., Ts=583° C., and Tr=330° C.
A5083 . . . Tl=640° C., Ts=535° C., and Tr=300° C.
A7N01 . . . Tl=640° C., Ts=508° C., and Tr=300° C.
AlSiMg . . . Tl=610° C., Ts=566° C., and Tr=300° C.

<Spot Welding>

«Production of Sample»

(1) Materials to be Joined

Figure 3:
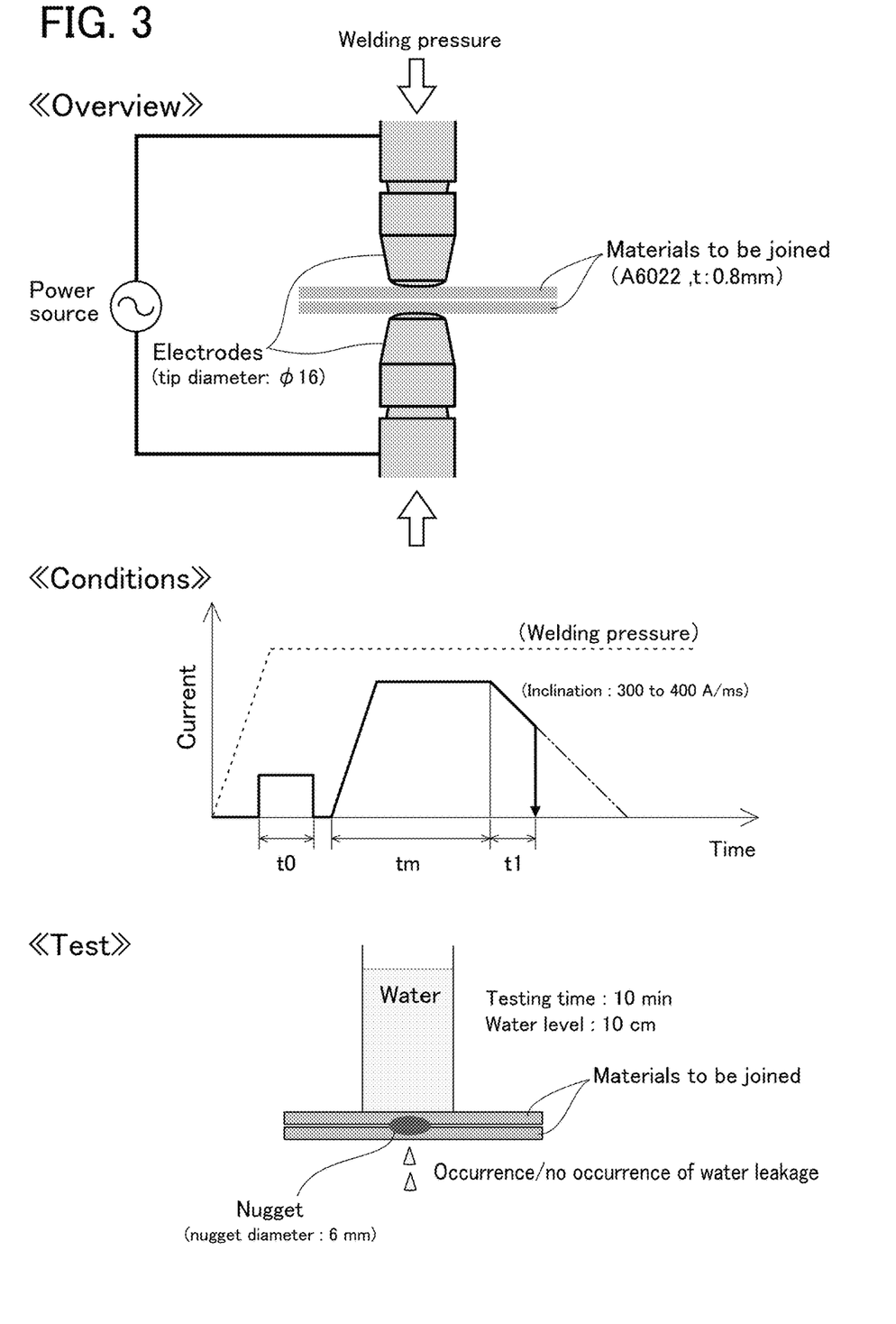
FIG. 3 is a set of schematic diagrams illustrating an overview and conditions of spot welding and a water leakage test.

A sheet material (sheet thickness: 0.8 mm) of an aluminum alloy (A6022) was prepared as the material under test. Two sheet pieces (materials to be joined) obtained by cutting the sheet material into strips (30 mm×100 mm) were stacked and spot-welded. The outline at that time is illustrated in FIG. 3.

(2) Electrodes

The used electrodes were a pair of commercially available DR-type tips (JIS C9304) (available from OBARA Corporation). The tip diameter was φ16 mm and the thickness of the tip bottom was 12 mm. Forcibly circulated cooling water (flow rate: 4 L/min) was supplied into the inside (inner cylindrical parts) of the tips. This forcibly cooled the tips.

The electrodes were made of chrome copper (Cr: 1 mass %, Cu: the balance) and its electrical conductivity was 80% IACS.

(3) Welding

Both outer sides of the work obtained by stacking the above-described two sheet pieces (materials to be joined) were clamped between a pair of the same electrodes (tips). The welding pressure at that time was set constant at 5,000 N (about 100 MPa).

While in the clamping state, energization was performed along the time chart illustrated in FIG. 3. Prior to the primary energization, pilot energization (12,000 A×t0 100 ms) was performed. The pilot energization was performed at a lower temperature than the melting point of the materials to be joined for the purposes of softening the materials and pressurizing the materials to make the mating surfaces fit each other.

Then, the primary energization (35A×tm 32 ms) was performed (heating step). The primary energization forms a molten part inside the sheet pieces (around the contact surfaces).

The primary energization was followed by a cooling process I (first cooling process) in which the current value was linearly and gradually reduced and a cooling process II (second cooling process) in which the current was shut off. The time rate of change of the current in the cooling process I was set to 300 to 400 A/ms. The sheet pieces (molten part) after the primary energization are slowly cooled in the cooling process I, and the sheet pieces (molten part or solidified part) after the cooling process I are rapidly cooled through the electrodes in the cooling process II.

The time (t1) for performing the cooling process I was changed at intervals of 10 to 25 ms (0 ms≤t1≤120 ms). The time of t1=0 ms means that only the cooling process II (rapid cooling immediately after the heating step) was performed. The time of the cooling process II was set to 200 ms.

Thus, a plurality of samples was produced by performing the spot welding while changing the conditions for the cooling step. It was confirmed that nuggets having a diameter of about 6 mm were formed in all the samples. The nuggets have a thickness of 4 √t or more with respect to the sheet thickness (t) and also have a size ensuring sufficient welding strength.

«Water Leakage Test»

A water leakage test as illustrated in FIG. 3 was performed for each sample. In the water leakage test, a water column (height: 10 cm) was held in a liquid-tight state on the surface of each spot-welded sample, and the occurrence/non occurrence of water leakage from the welded part of each sample was observed.

The water leakage test was performed on samples of N=30 for one condition (t1 of the cooling process I). For each condition, the occurrence ratio of water leakage (%) was calculated by dividing the number of samples in which water leakage occurred by the total number. The relationship thus obtained between the time (t1) of the cooling process I and the occurrence ratio of water leakage is summarized in FIG. 4.

At the time of t1=30 ms, the temperature of the welded part was about 600° C. (i.e., Ts+about 12° C.) and the solid phase ratio was about 100%. This was determined through performing temperature analysis using the welding simulation software (SORPAS available from SWANTEC Software and Engineering ApS) and obtaining the solid phase ratio at the temperature from a solid phase ratio-temperature diagram acquired using the integrated thermodynamic calculation software (Thermocalc).

«Evaluation»
(1) Weld Cracking

Figure 4:
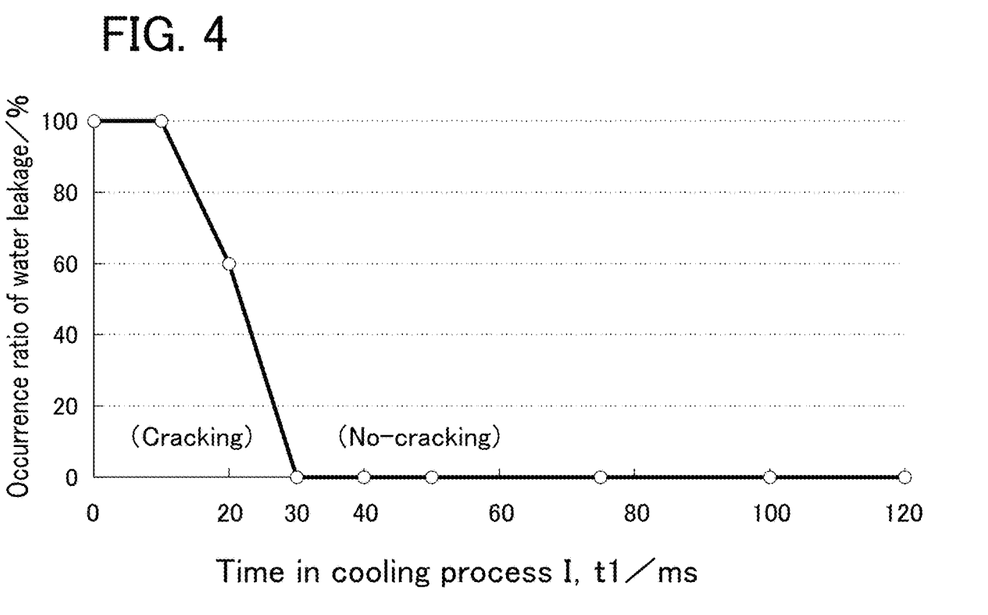
FIG. 4 is a graph illustrating the relationship between time (t1) in the first cooling process and an occurrence ratio of water leakage.

As is apparent from FIG. 4, it has been confirmed that when the cooling process I transitions to the cooling process II at the timing at which a predetermined time (t1≥30 ms) has elapsed from immediately after the heating step, solidification cracking (water leakage) does not occur in the welded part. From this, it has been found that if the slow cooling is performed for the predetermined time (t1≥30 ms) from immediately after the heating step, for example, rapid cooling is possible thereafter. That is, efficient spot welding can be performed while suppressing the solidification cracking.

For reference, it is assumed that the cooling process I shifts to the cooling process II, for example, at t1=30 ms. In this case, the temperature of the molten part changes from about 600° C. to 500° C. or lower during the cooling process I. The strain generated in the molten part changes from about 0.15% to about 1%. When applied to the BTR diagram of A6022, the cooling process I falls under the non-cracking region. Moreover, the cooling process II also falls under the non-cracking region because the boundary line of the BTR diagram rises sharply.

(2) Observation of Samples

Figure 5:
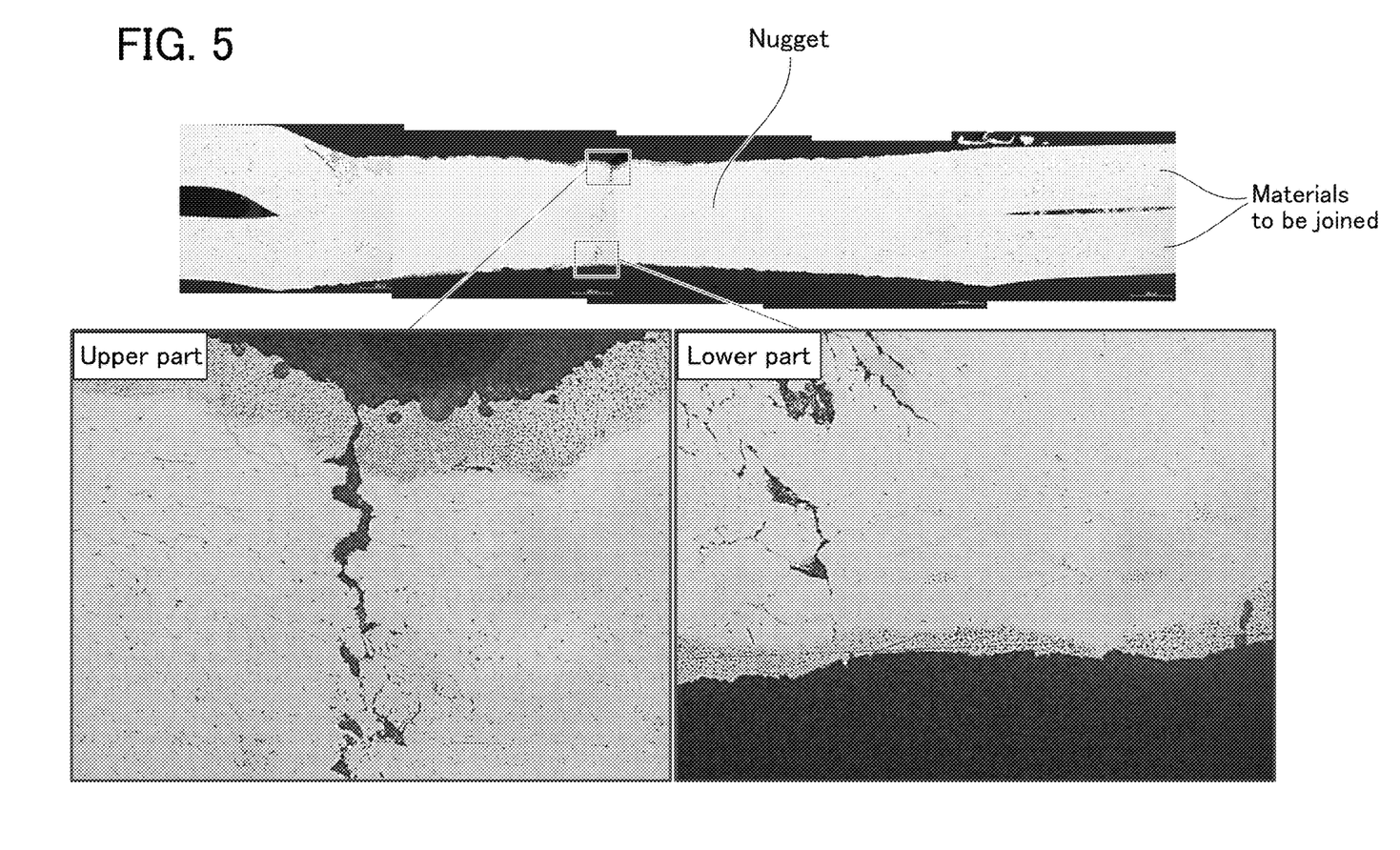
FIG. 5 is a set of optical micrographs captured on the cross section of a sample in which the solidification cracking (water leakage) occurred.

FIG. 5 shows photographs obtained by using an optical microscope to observe the cross section of a sample (t1=15 ms) in which water leakage occurred. As is apparent from FIG. 5, cracks were observed from around the center of the surface of the join part to the solidified part (nugget). Such cracks were not observed in the samples in which water leakage did not occur.

Figure 6:
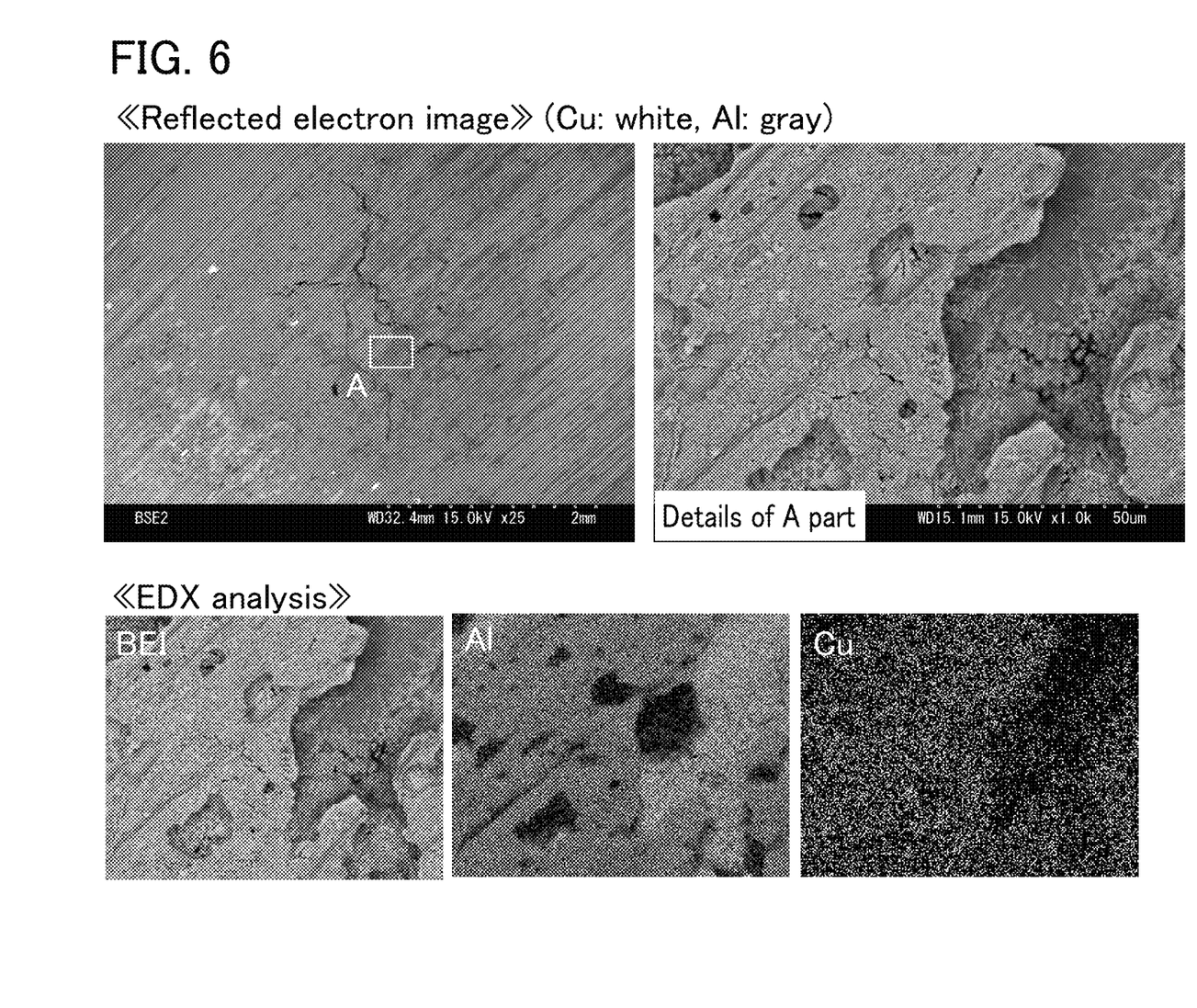
FIG. 6 is a set of electron microscope observation images captured on the surface of a sample in which the solidification cracking did not occur.

FIG. 6 shows photographs obtained by using a scanning electron microscope (SEM) and an energy dispersive X-ray analyzer (EDX) to observe the surface of a sample (t1=30 ms) in which water leakage did not occur. As is apparent from FIG. 6, when the rapid cooling (cooling process II) was performed after the slow cooling, the welding adhesion due to the eutectic reaction between Al and Cu was small. This appears to be because the high temperature contact time between the electrode and the join part was shortened.

The invention claimed is:

1. A spot welding method comprising:
   a heating step of providing input energy at a current value for energizing an electrode, the electrode in pressure contact with an aluminum alloy member to heat and melt a join part of the aluminum alloy member by resistance heating and the current value being a heating current value; and
   a cooling step of cooling the join part after the heating step in a state in which the electrode is in pressure contact with the aluminum alloy member,
   the aluminum alloy member being made of an aluminum alloy of Mg: 0.2 to 1.2 mass % (simply referred to as "%"), Si: 0.4 to 1.5%, and Cu: 1.1% or less or an aluminum alloy of Si: 7 to 11% and Mg: 0.1 to 0.4% with respect to 100% as a whole,
   the cooling step including a first cooling process and a second cooling process,
      wherein the first cooling process is performed immediately after the heating step and comprises gradually reducing the current value for energizing the electrode from the heating current value to a lower current value such that there is a reduced amount of input energy to the join part as compared with the heating step, and
      wherein the second cooling process is performed after the first cooling process and the second cooling step is performed at a higher cooling rate than a cooling rate in the first cooling process, and
      wherein when a temperature of a molten part formed in the heating step is cooled to within a temperature range (Ts+10° C. to Ts+50° C.) in which the temperature of the molten part is higher than a solidus temperature (Ts) of the aluminum alloy by 10 to 50° C., the cooling step is shifted from the first cooling process to the second cooling process.

2. The spot welding method according to claim 1, wherein a reduction rate of the current value in the first cooling process is 150 to 450 A/ms.

3. The spot welding method according to claim 1, wherein the first cooling process is continued until a solid phase ratio of the molten part formed in the heating step becomes at least 60% or more.

4. The spot welding method according to claim 1, wherein the first cooling process and the second cooling process are performed at a cooling rate that does not cross a boundary line of a diagram representing a brittleness temperature region of the aluminum alloy.

5. The spot welding method according to claim 1, wherein the second cooling process includes shutting off energization to the electrode.

6. The spot welding method according to claim 1, wherein the second cooling process is continued until a temperature of a welded part becomes a temperature equal to or lower than a recrystallization temperature of the aluminum alloy.

7. The spot welding method according to claim 1, wherein the heating step and the cooling step are performed while pressurizing the join part with the electrode at 50 MPa to 150 MPa.

8. The spot welding method according to claim 1, wherein the second cooling process is started before the current value of the first cooling process becomes zero, and the second cooling process comprises setting the current value to zero.

* * * * *